US009086497B2

(12) United States Patent
Bendahan

(10) Patent No.: US 9,086,497 B2
(45) Date of Patent: Jul. 21, 2015

(54) MULTI-VIEW CARGO SCANNER

(75) Inventor: Joseph Bendahan, San Jose, CA (US)

(73) Assignee: Rapiscan Systems, Inc., Torrance, CA (US)

(*) Notice: Subject to any disclaimer, the term of this patent is extended or adjusted under 35 U.S.C. 154(b) by 240 days.

(21) Appl. No.: 13/009,765

(22) Filed: Jan. 19, 2011

(65) Prior Publication Data

US 2011/0206179 A1  Aug. 25, 2011

Related U.S. Application Data

(60) Provisional application No. 61/296,080, filed on Jan. 19, 2010.

(51) Int. Cl.
G01V 5/00 (2006.01)

(52) U.S. Cl.
CPC .............. *G01V 5/005* (2013.01); *G01V 5/0016* (2013.01)

(58) Field of Classification Search
CPC .......... A61B 6/02; A61B 6/03; A61B 6/4021; A61B 6/4028; G01V 5/0016; G01V 5/005
USPC ............................................ 378/9, 10, 12, 57
See application file for complete search history.

(56) References Cited

U.S. PATENT DOCUMENTS

| | | | | |
|---|---|---|---|---|
| 4,658,408 A * | 4/1987 | Amor et al. | | 378/4 |
| 5,065,418 A * | 11/1991 | Bermbach et al. | | 378/57 |
| 5,091,924 A | 2/1992 | Bermback et al. | | |
| 5,197,088 A * | 3/1993 | Vincent et al. | | 378/10 |
| 5,259,012 A * | 11/1993 | Baker et al. | | 378/21 |
| 5,491,734 A * | 2/1996 | Boyd et al. | | 378/10 |
| 5,504,791 A * | 4/1996 | Hell et al. | | 378/10 |
| 7,233,644 B1 * | 6/2007 | Bendahan et al. | | 378/57 |
| 2002/0094064 A1 * | 7/2002 | Zhou et al. | | 378/122 |
| 2004/0081269 A1 * | 4/2004 | Pan et al. | | 378/4 |
| 2004/0109532 A1 * | 6/2004 | Ford et al. | | 378/57 |
| 2005/0117694 A1 * | 6/2005 | Francke | | 378/4 |
| 2005/0226364 A1 * | 10/2005 | Bernard De Man et al. | | 378/9 |
| 2007/0237293 A1 * | 10/2007 | Singh | | 378/57 |
| 2008/0043910 A1 * | 2/2008 | Thomas | | 378/65 |
| 2008/0137805 A1 * | 6/2008 | Forster et al. | | 378/10 |
| 2008/0304622 A1 * | 12/2008 | Morton | | 378/51 |
| 2010/0111260 A1 * | 5/2010 | Motz et al. | | 378/144 |

OTHER PUBLICATIONS

International Search Report for PCT/US11/21758, Jul. 28, 2011, Rapiscan Systems.
Written Opinion on Patentability for PCT/US11/21758, Jul. 7, 2011, Rapiscan Systems.
Report on Patentability for PCT/US11/21758, Jul. 7, 2011, Rapiscan Systems.

* cited by examiner

*Primary Examiner* — Glen Kao
(74) *Attorney, Agent, or Firm* — Novel IP

(57) ABSTRACT

The present invention provides a multi-view X-ray inspection system. In one embodiment, a beam steering mechanism directs the electron beam from an X-ray source to multiple production targets which generate X-rays for scanning which are subsequently detected by a plurality of detectors to produce multiple image slices (views). The system is adapted for use in CT systems. In one embodiment of a CT system, the X-ray source and detectors rotate around the object covering an angle sufficient for reconstructing a CT image and then reverse to rotate around the object in the opposite direction. The inspection system, in any configuration, can be deployed inside a vehicle for use as a mobile detection system.

22 Claims, 11 Drawing Sheets

MULTI-VIEW CARGO SCANNER

CROSS-REFERENCE TO RELATED APPLICATIONS

The present invention relies on U.S. Provisional Patent Application No. 61/296,080, of the same title, and filed on Jan. 19, 2010, for priority, which is hereby incorporated by reference.

FIELD OF THE INVENTION

The present invention is directed to a multi-view, multi-energy cargo scanner and, more specifically, methods and systems of cost-effectively increasing the number of scanning views of an object or cargo under inspection, thereby improving estimations of the density and atomic number of the cargo contents for enhanced detection of contraband and other materials of interest.

BACKGROUND OF THE INVENTION

Cargo containers need to be inspected at ports and other points of entry or transportation for contraband such as explosives, narcotics, currency, chemical and nuclear weapons, and for cargo-manifest verification. Detection of contraband with both high detection rates and low false alarm rates is a daunting task, as these materials often have similar physical characteristics as benign cargo. The percentage of cargo to be inspected is increasing and, because of the currently manually intensive nature of inspections, so is the number of operators. Therefore, there is a need to provide an automatic detection system to reduce the number of operators, or, at least, provide assistance tools that help operators improve their throughput by scrutinizing the cargo images more efficiently, thereby increasing detection and analysis speed.

Standard and advanced X-ray systems have difficulty detecting contraband in break-bulk cargo. This difficulty is exacerbated when inspecting larger and/or cluttered pallets and cargo containers. Computed Tomography (CT) based systems have been shown to be more suitable for the difficult task of detecting aviation-threat explosives in luggage and, more recently, in larger objects.

However, existing high-energy CT systems for large objects are configured horizontally (horizontal gantry) with the object rotating around its axis. In one case, the source and detectors move vertically, and in the other case, the object moves vertically while the source and detectors are stationary. In both cases, the length of the scanned objects is limited by the system size and the configuration prevents scaling the system up to long objects such as large cargo containers and large skids.

For example, U.S. Pat. No. 5,065,418, to Heimann, describes "[a]n apparatus for inspecting articles to identify items within the articles, said apparatus comprising: means for generating a first x-ray fan beam; means for generating a second x-ray fan beam; means for moving an article to be inspected through said first and second x-ray fan beams in a direction perpendicular to said x-ray fan beams; first means for detecting radiation disposed to receive radiation from said first x-ray fan beam after penetrating said article, said first means for detecting radiation being U-shaped; second means for detecting radiation disposed to detect radiation from said second x-ray fan beam after penetrating said article, said second means for detecting radiation being L-shaped; and means for generating an image of said article from the radiation detected by said first and second means for detecting radiation."

In addition, U.S. Pat. No. 5,091,924, to Heimann, describes "[a]n apparatus for inspecting item-containing articles for identifying the presence of items contained within the articles, said apparatus comprising: means for generating a fan-shaped radiation beam directed at an item-containing article to be inspected; means for detecting radiation from said fan-shaped radiation beam after penetrating said item-containing article and for converting the detected radiation into electrical signals; calculation means for calculating and generating an actual image of the item-containing article being inspected from the electrical signals of said means for detecting radiation; memory means for storing electrical signals comprising a reference image of said item-containing article being inspected; means for comparing said electrical signals comprising said reference image of said item-containing article with the electrical signals forming said actual image, said comparison means forming a differential image including items which are not present in said reference image; and means for displaying said differential image."

However, the design and method of current detection system limits the depth of information that can be obtained from scanned objects. Enhanced depth information typically requires a plurality of sources. Therefore, there is a need for detection systems which are flexible and can scan objects of various sizes, while providing both depth information and images of high resolution that use a minimum amount of sources. There is also a need for scanning systems that work on reduced cost, power consumption and machine size.

SUMMARY OF THE INVENTION

In one embodiment, the present invention is directed towards an inspection system for generating an increased number of scanning views of an object under inspection, comprising: a source for generating a high-energy electron beam; an electron beam steering system comprising a plurality of steering devices, for directing said electron beam to a corresponding plurality of production targets, said production targets generating radiation that scans the object; a plurality of detector arrays that detect said radiation to produce a corresponding plurality of scanning views; and a transport mechanism to move the object through the system. In one embodiment, said plurality of detector arrays exceeds the number of production targets.

Optionally, each of said steering devices is coupled to at least one production target. In one embodiment, the number of steering devices, production targets and detector arrays is different. In another embodiment, the same number of steering devices, production targets and detector arrays is the same. In one embodiment, the steering device is a magnet or a plurality of magnets. The production targets produce radiation that scans the object at different angles. The plurality of scanning views is then reconstructed to produce a laminographic image of said object that provides depth information. In one embodiment, the source is a linac and x-rays are produced once the electron beam hits the production target.

In another embodiment, the present invention is directed towards a Computed Tomography (CT) system for scanning an object, comprising: a high-energy X-ray source; at least one detector array placed opposite to said high energy X-ray source and configured to move along with said high energy X-ray source around the object in an arcuate trajectory; and a transport mechanism to move the object through the system, wherein said source and said at least one detector subsystem in each scanning step rotate an angle around the object then reverse to rotate around the object in the opposite direction in a subsequent scanning step. In one embodiment, the arcuate trajectory ranges from 20 to 270 degrees. In one embodiment, the at least one detector subsystem comprises at least one of a plurality of detector arrays or a multi-slice detector. Optionally, the source is a dual energy source.

In one embodiment, the scan angle is sufficient for reconstructing a CT image. Optionally, the angle covered by the sources and detectors in each rotation is 180° plus the fan angle, which in one embodiment is approximately 60 degrees.

The object is stationary during the scan and moved incrementally at the end of each rotation. The object is preferably translated at a constant speed. Optionally, the object moves along a conveyor at a speed modulated by the rotational speed of the source and detector subsystems, and wherein the conveyor speed varies linearly with the rotational speed of the rotating gantry.

In another embodiment, the present invention is directed towards a Computed Tomography (CT) system for scanning an object, comprising: a high-energy source for generating an electron beam; an electron beam steering system comprising a plurality of steering devices for directing said electron beam to a corresponding plurality of production targets, said production targets generating radiation and wherein said steering devices and production targets are arranged about the scanning volume such that the radiation produced by the production targets is electronically rotated around the object being scanned; a transport mechanism to move the object through the system, and a detector subsystem for detecting the scanning radiation, wherein the detector subsystem is one of at least one detector array or a multi-slice detector.

All the above mentioned embodiments can be used in different configurations such in a fixed site, gantry or mobile configurations.

Optionally, the scanning system(s) of the present invention are contained within a vehicle and further comprise a transport mechanism for translating the object to be inspected from outside the vehicle through the scanning system and wherein said transport mechanism is at least one of a conveyor or ramp.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

Figure 1:
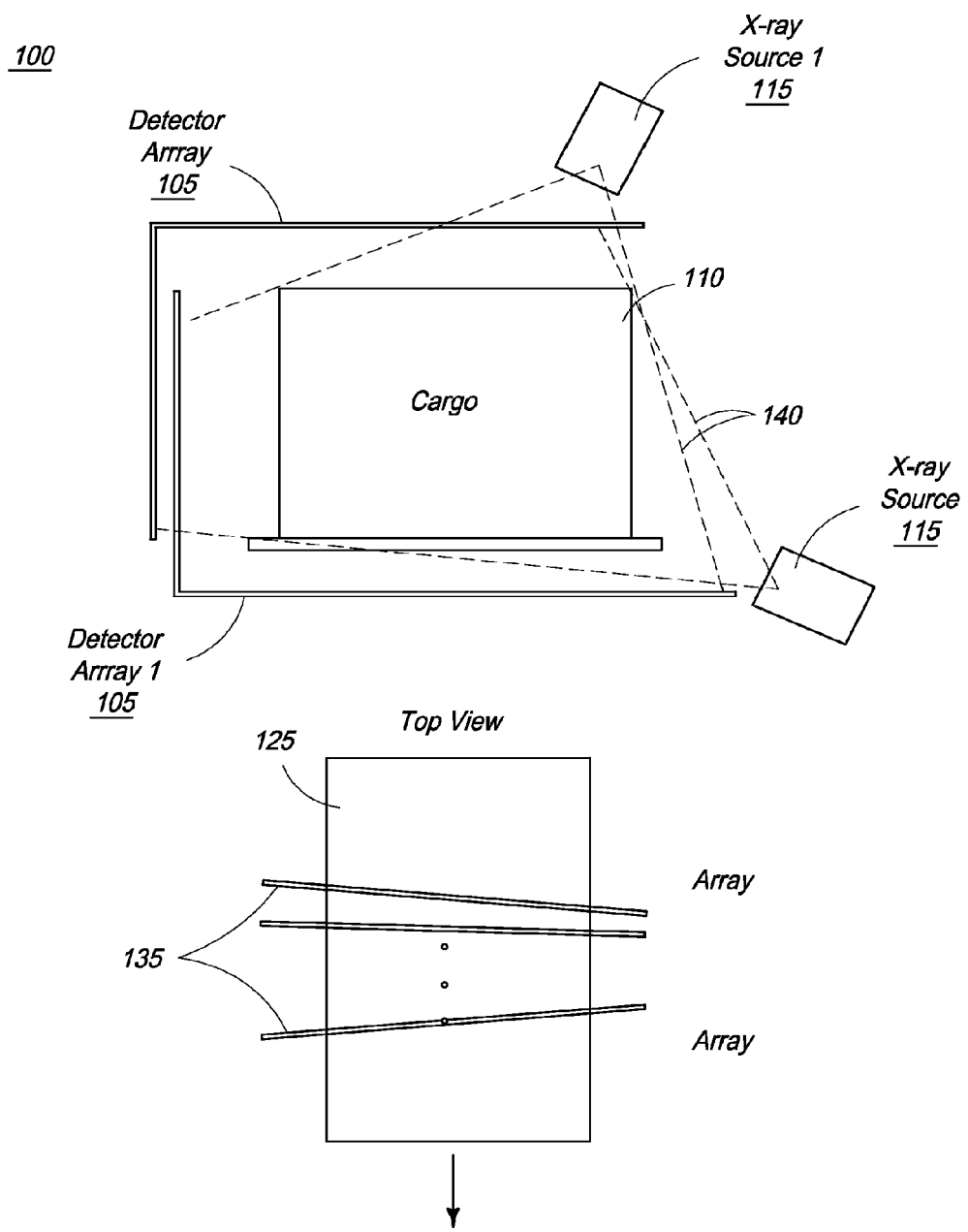
FIG. 1 shows a high energy X-ray system with at least two X-ray sources.

The present invention is directed towards methods and systems for obtaining multiple scanning views of an object or cargo under inspection, thereby improving estimations of the density and atomic number of the cargo contents for enhanced detection of contraband and other materials of interest. In addition, the present invention is directed towards methods and systems for obtaining multiple scanning views of an object or cargo under inspection without using additional sources or detector arrangements.

In a first embodiment, the present invention is directed toward an X-ray system comprising electron optics and/or beam transport systems that enable a single source to be implemented with multiple X-ray production targets, to yield a plurality of views. The leveraging of a single source with multiple X-ray production targets to yield multiple views reduces cost, power consumption and machine size.

In one embodiment, the source is a radiation source, such as a linear accelerator (linac) that is used to produce an electron beam. While the present invention is described with respect to use of a linac as the source, it should be understood that a number of sources can be used, for example, but not limited to such example, a particle accelerator (e.g. deuterons). If a particle accelerator is employed, the x-ray production targets are replaced with neutron production targets (e.g. deuterium gas) to produce neutrons.

In addition, when implemented in a CT system, a single source with multiple X-ray production targets yields both multiple views and higher effective rotational frequencies difficult to implement with a mechanical gantry.

Therefore, in a second embodiment, the present invention is directed towards a synchronized conveyor and oscillating source/detector system whereby the degree and nature of the source/detector system's oscillation is tied to, and dependent upon, a step-wise progression of an object on a conveyor system. For example, the system can comprise a conveyor belt extending along a horizontal axis, around which a source/detector system can oscillate and generate a plurality of views from a plurality of angles, depending upon the source/detector position. The system then operates by moving an object on a conveyor system to a first linear position, stopping the conveyor system, initiating a scan by the source/detector system from a first arc position, completing the scan, moving the conveyor system (and therefore the object) to a second linear position, initiating a scan by the source/detector system from a second arc position, completing the scan, moving the conveyor system (and therefore the object) to a third linear position and repeating the aforementioned steps.

This "oscillating" approach enables a system that avoids the use of a slipring, which is a complex mechanism to transfer power and signal, and is more compact as there is no need for the space to complete a full revolution. In this embodiment, an effective helical scan can be performed using a synchronized source/detector rotation and conveyor motion and need not be produced using the conventional constant rotational frequency and constant conveyor speed. In this embodiment, the conveyor speed varies linearly with the rotational speed of the rotating gantry. During a substantial portion of the gantry trajectory, the rotational speed is maximum and constant, while the conveyor speed is also at a maximum and constant speed. At each end point, the gantry stops (to reverse direction) as does the conveyor. The acceleration and deceleration profiles of the gantry are also followed by the conveyor.

In one embodiment, a CT implementation of the present invention is applied to scanning large objects. A larger tunnel size is used to inspect, for example pallets, along with high-energy (megavoltage) X-rays capable of penetrating highly attenuating materials. The system produces density and approximate atomic number (Z) data and high-resolution, three-dimensional (3D) images of cargo without interposition typical of radiographic images. These properties facilitate the identification of the type of cargo and allow for detection of different materials concealed within cargo.

In another embodiment, the present invention employs a vertical gantry where the detectors and source of radiation are configured in a substantially vertical orientation. This configuration allows for the scanning of very long objects. In addition, the vertical gantry is capable of faster rotational frequency, resulting in a higher throughput; while the horizontal gantry requires object rotation, which limits the rotational frequency (and therefore throughput) to less than 10 rpm due to the motion of the container contents.

In a third embodiment, the present invention is directed towards a CT system that advantageously employs one source and does not require mechanical movement. Thus, the movement is achieved electronically rather than mechanically by rastering an electron beam generated from an X-ray source along an approximated arc using a combination of magnets and quadrupoles. The electron beam is directed toward at least one X-ray production target to produce a rotating X-ray beam (stationary gantry), while the object is translated at a constant speed.

All the above mentioned embodiments can be used in different configurations such in a fixed site, gantry or mobile configurations, further including a conveyor mechanism or other transport mechanism.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Referring to FIG. 1, X-ray system 100 is shown. The system generates at least one and preferably a plurality of views by deploying at least two X-ray sources 115 around the cargo 110 to be scanned. A typical configuration includes one source and one detector array, generally. Some systems use two sources with a detector array placed on each side. Finally, the multiple views can also be generated by multiple detector arrays "driven" by a single source, where the arrays are close and have a smaller angle.

Figure 2A:
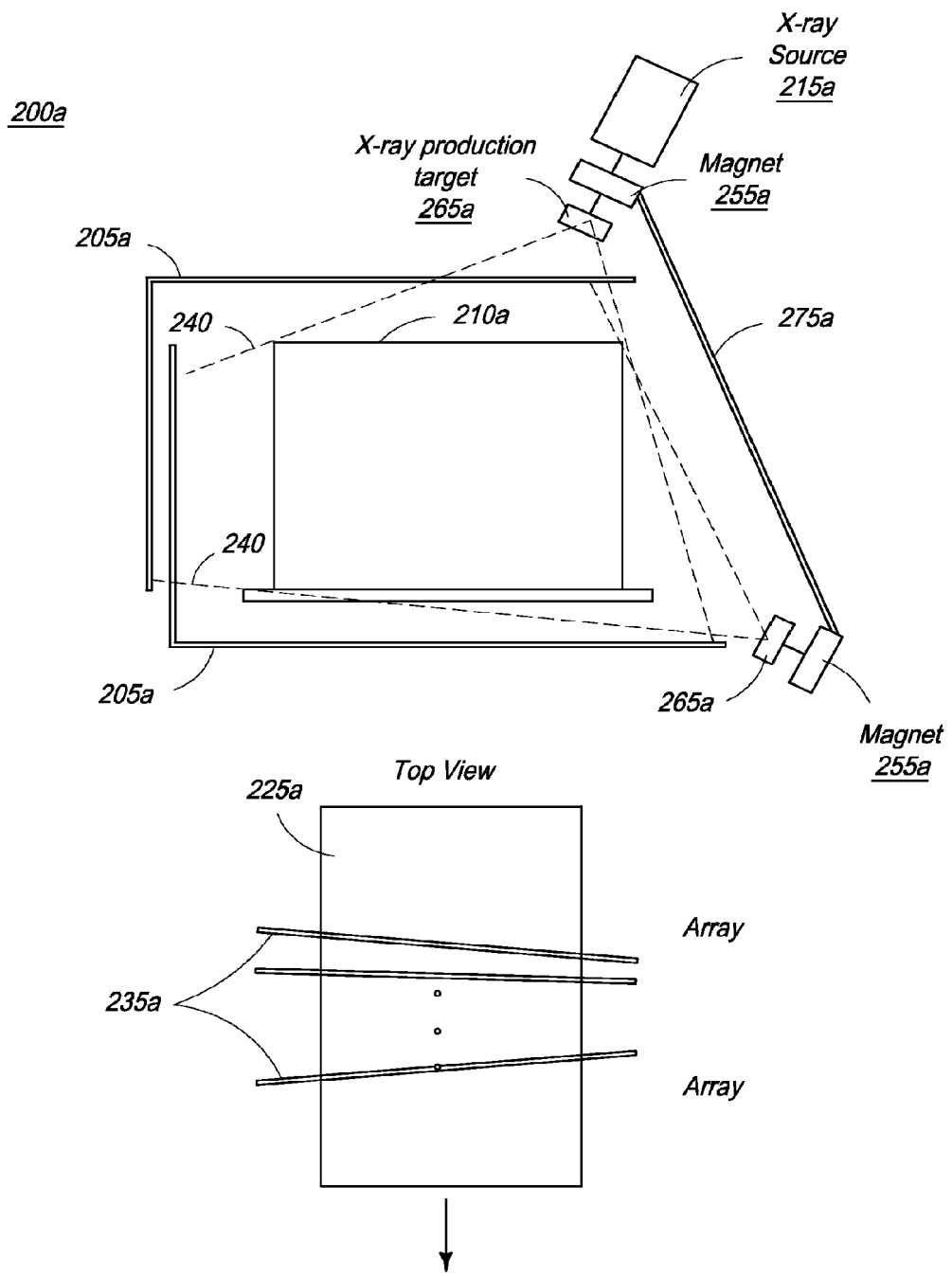
FIG. 2a shows one embodiment of the present invention employing a plurality of X-ray production targets using less than N X-ray sources to generate N multiple views.

Radiation 140 from the X-ray sources is detected by a plurality of detector arrays 105. A top view 125 shows a plurality of slices, or views N, 135, corresponding to the at least two X-ray sources. As shown in FIG. 2a, the multi-view X-ray scanning system of FIG. 1 can be modified with electron-beam optics that transport electrons to multiple X-ray production targets to yield a larger number of views without increasing the number of sources. It should be understood by those of ordinary skill in the art that any X-ray production target may be used as long as it achieves the purpose of the present invention. In one embodiment, the X-ray production target is comprised of tungsten backed with water-cooled copper. Referring to FIG. 2a, the X-ray system 200a employs a single X-ray source 215a that emits electrons toward a charged particle steering system, and in one embodiment, electron beam steering system 255a. In one embodiment, electron beam steering system comprises at least one magnet and preferably a plurality of distributed magnets. The plurality of magnets 255a redirects the electrons toward a plurality of corresponding X-ray production targets 265a.

X-ray system 200a generates N views by deploying fewer than N X-ray sources 215a, whose emissions are directed to a plurality M of X-ray production targets 265a using a steering system 275a. The plurality of X-ray production targets 265a generate radiation beams 240a, which scan the object 210a and is detected by the plurality of detector arrays 205a. It should be noted herein that the detectors may comprise a multi-slice detector arrangement. A top view 225a shows the plurality of slices, or views N, 235a, corresponding to the X-ray production targets.

Figure 2B:
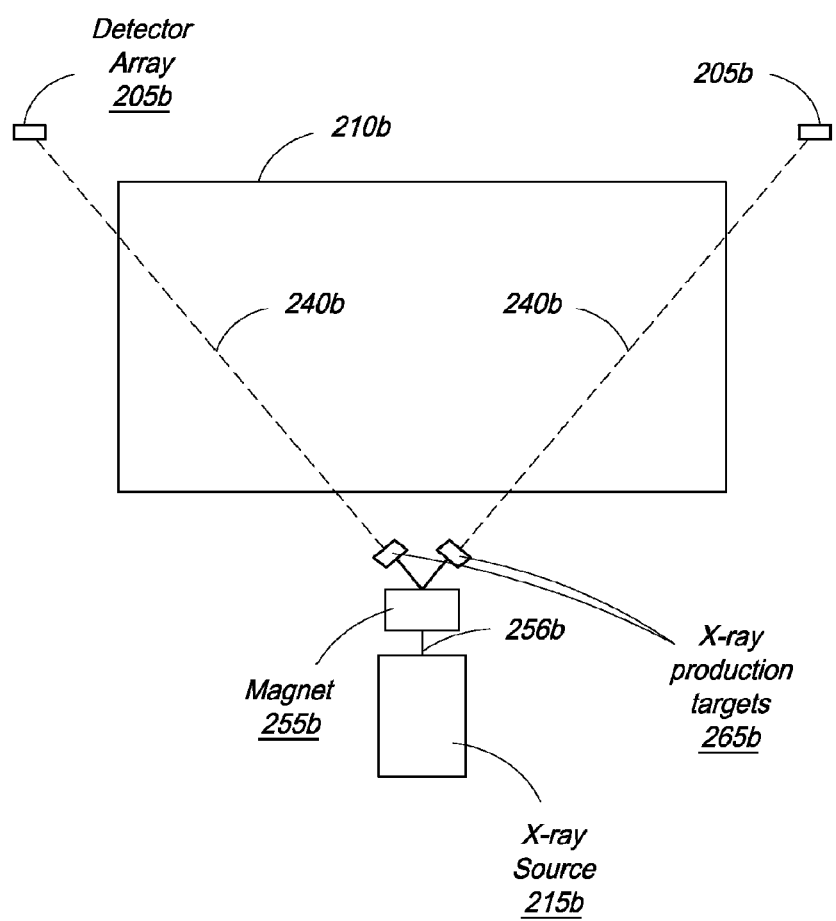
FIG. 2b shows another embodiment of the present invention employing a plurality of X-ray production targets using less than N X-ray sources to generate N multiple views.

FIG. 2b shows another embodiment of the x-ray detection system where the multiple views are generated at substantially large angles. In this embodiment, a single X-ray source 215b is used in conjunction with a steering mechanism comprising a magnet 255b to direct the electron beam 256b from the X-ray source 215b to two X-ray production targets 265b. This results in two radiation beams 240b, which are used to scan the object 210b. The beams 240b are detected by two or more detectors 205b. The advantage of this approach is that for large angles, for example, angles larger than 30 degrees, the beam is directed towards the array resulting in no loss of x-rays due to the angular distribution of the radiation.

Figure 3:
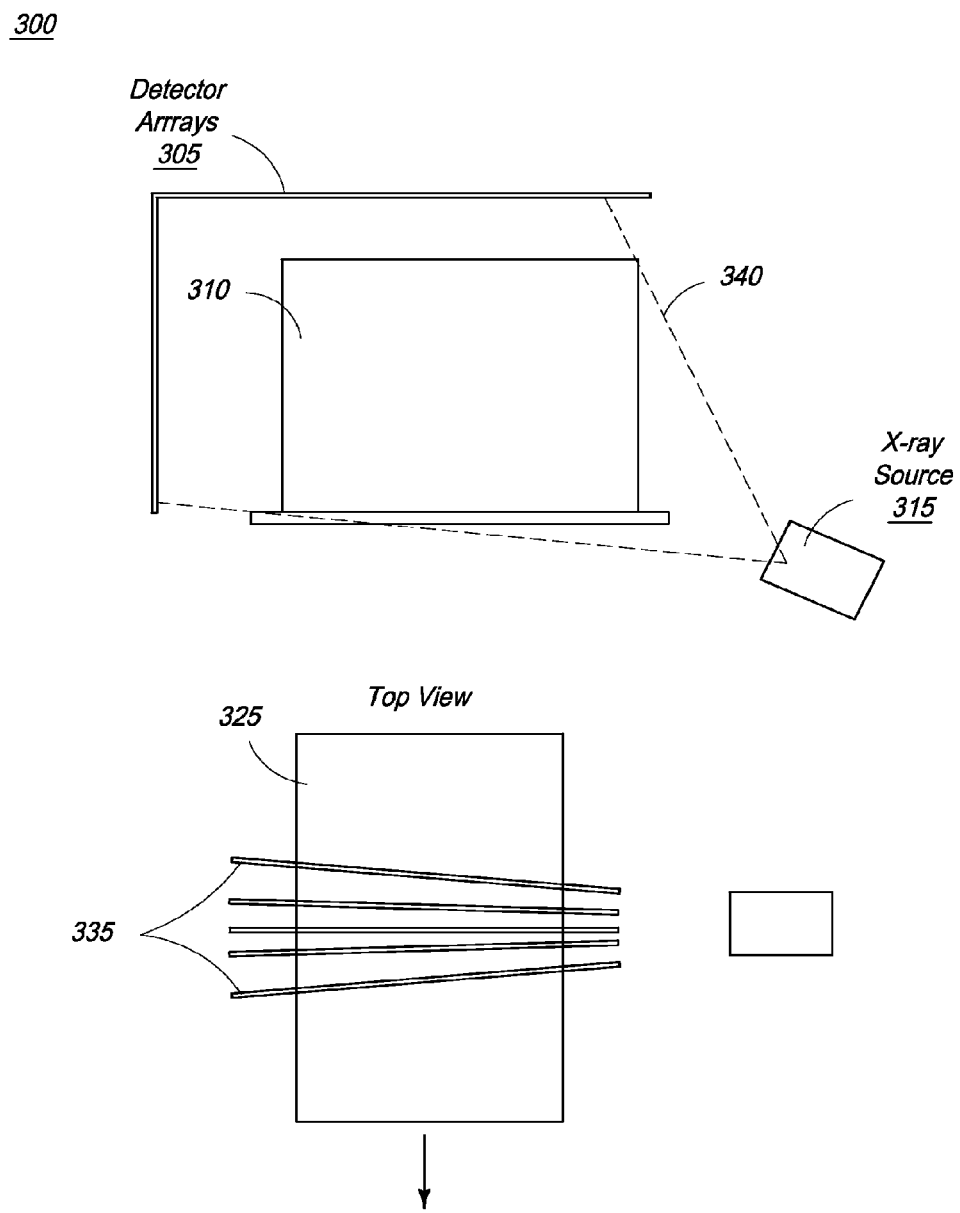
FIG. 3 shows a high energy scanning system with an X-ray source generating a plurality of angled views using multiple detector arrays.

FIG. 3 illustrates a scanning system 300 in which multiple views are generated with a single x-ray source. Referring to FIG. 3, system 300 uses a fan beam of radiation 340 generated from the X-ray source 315 to scan the object 310. After scanning, radiation is detected in multiple detector arrays 305, thereby generating multiple views. A top view 325 shows the N slices, or views, 335, corresponding to the multiple detector arrays 305. As shown in FIG. 3, the views 335 are generated at different angles, owing to the detector positions being at various angles (in this case, in 'L' shape) to the X-ray source.

Figure 4:
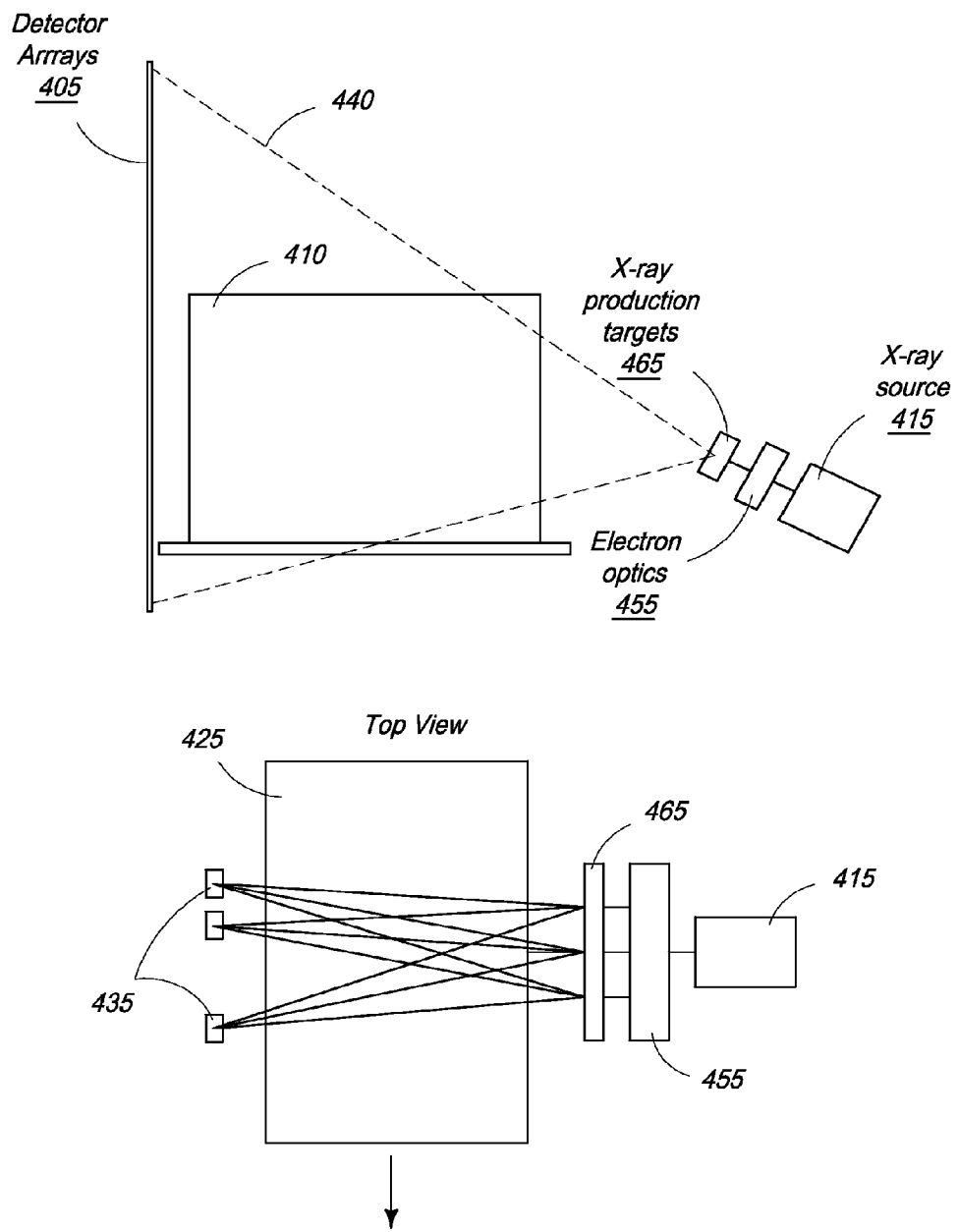
FIG. 4 depicts an X-ray source generating a plurality of substantially parallel views, using at least one detector array and at least one x-ray production target.

FIG. 4 illustrates the method of generating multiple views employed by the present invention. Referring to FIG. 4, radiation emitted from a single X-ray source 415 is directed toward cargo 410 using a beam steering mechanism comprising electron optics 455 and at least one associated x-ray production target 465, as described earlier. In this case, only a single X-ray source is used, but the radiation 440 is directed such that multiple views are generated for each target. Radiation is detected by a plurality of detector arrays 405, which are arranged in a straight vertical line. The number of views and the number of x-ray production targets 465 are preferentially different, generating a multiplicity of angles traversing object 410 originating from the different x-ray production targets 465 and detected by arrays 405. Thus, for example, N x-ray production targets coupled with M detector arrays can produce up to N×M views. The different number of views improves the quality of the reconstructed image. Further, arranging the detectors in a vertical straight line allows the same array to be used for multiple sources or x-ray production targets, without requiring complicated collimation, or having an open beam that would increase the radiation dose.

Figure 10:
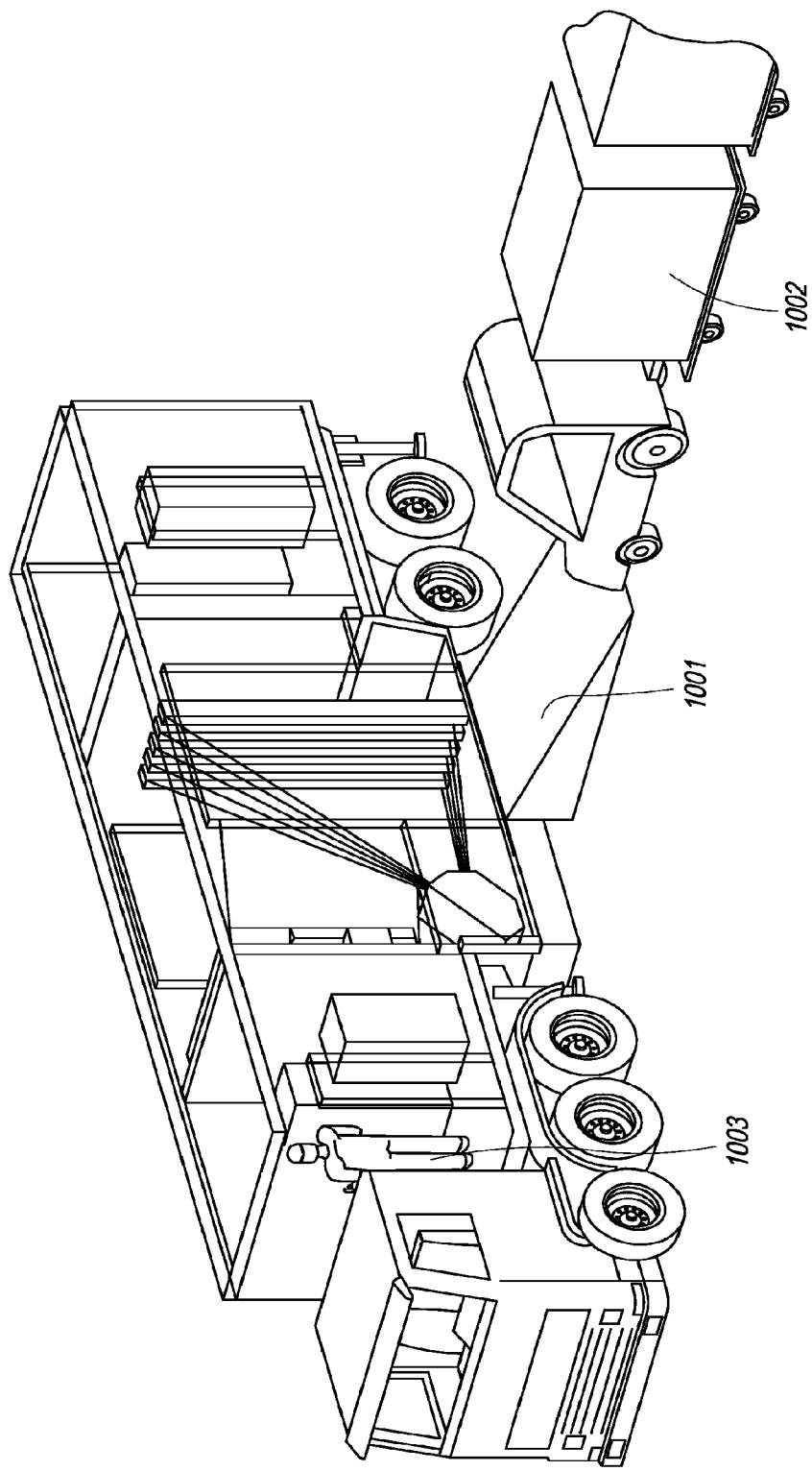
FIG. 10 illustrates another embodiment of the mobile inspection system that uses a ramp for drive-through inspection.

In one embodiment, the object moves at constant speed (or nearly constant and measured speed, e.g. radar). While it is preferred that the speed is constant, any variation in speed can be compensated for during measurement by triggering the sources based on speed. In one embodiment, the object is moved on a conveyor. In another embodiment, and as shown in FIG. 10 below, the object can be towed through the scanning system via use of a vehicle.

The electron beam is steered rapidly to each radiation-producing target in sequence. The detectors measure the radiation from each beam position.

This multiplicity of angles is employed to produce a plurality of x-ray images, or to reconstruct a laminographic image of object 410 allowing for depth information to be obtained. A top view 425 shows the slices, or views, 435, corresponding to the plurality of detector arrays.

For dual-energy inspection, the beam is interlaced and requires switching the position at double the rate. The rate would be the same, however, if two detector arrays are used per "tower". In the dual-energy case, atomic-number information will also be generated.

Figure 5:
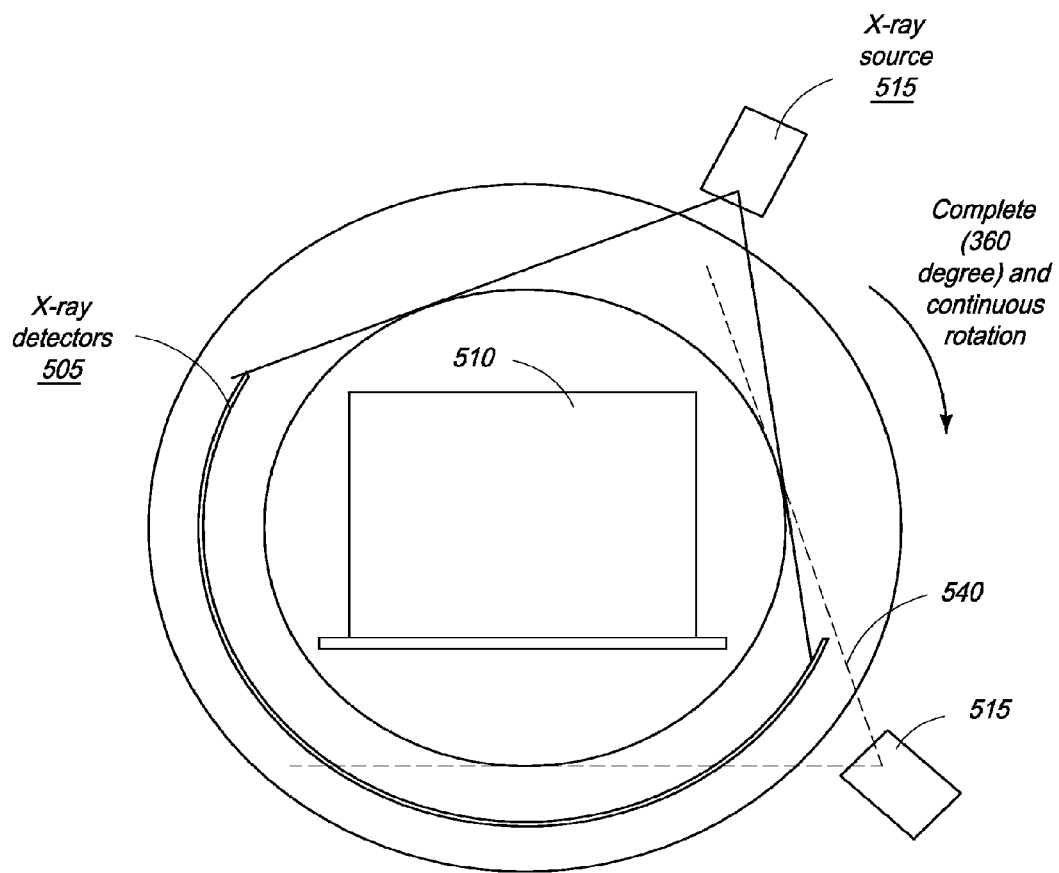
FIG. 5 illustrates a conventional, known CT system that employs multiple sources and multi-slice detectors.

Conventional CT systems, shown in FIG. 5, employ a single source 515 to emit radiation 540. X-ray source 515 in combination with x-ray detectors 505, conduct a complete and continuous rotation around scanned cargo 510.

As mentioned above, in another embodiment, the present invention is a synchronized conveyor and oscillating source/detector system whereby the degree and nature of the source/detector system's oscillation is tied to, and dependent upon, an incremental or step-wise progression of an object on a conveyor system. For example, the system can comprise a conveyor belt extending along a horizontal axis, around which a source/detector system can oscillate and generate a plurality of views from a plurality of angles, depending upon the source/detector position. The system then operates by moving an object on a conveyor system to a first linear position, stopping the conveyor system, initiating a scan by the source/detector system from a first arc position, completing the scan, moving the conveyor system (and therefore the object) to a second linear position, initiating a scan by the source/detector system from a second arc position, completing the scan, moving the conveyor system (and therefore the object) to a third linear position and repeating the aforementioned steps.

This "oscillating" approach enables a system that avoids the use of a slipring, which is a complex mechanism to transfer power and signal, and is more compact as there is no need for the space to complete a full revolution. In this embodiment, an effective helical scan can be performed using a synchronized source/detector rotation and conveyor motion and need not be produced using the conventional constant rotational frequency and constant conveyor speed. In this embodiment, the conveyor speed varies linearly with the rotational speed of the rotating gantry. During a substantial portion of the gantry trajectory, the rotational speed is maximum and constant, while the conveyor speed is also at a maximum and constant speed. At each end point, the gantry stops (to reverse direction) as does the conveyor. The acceleration and deceleration profiles of the gantry are also followed by the conveyor.

Figure 6:
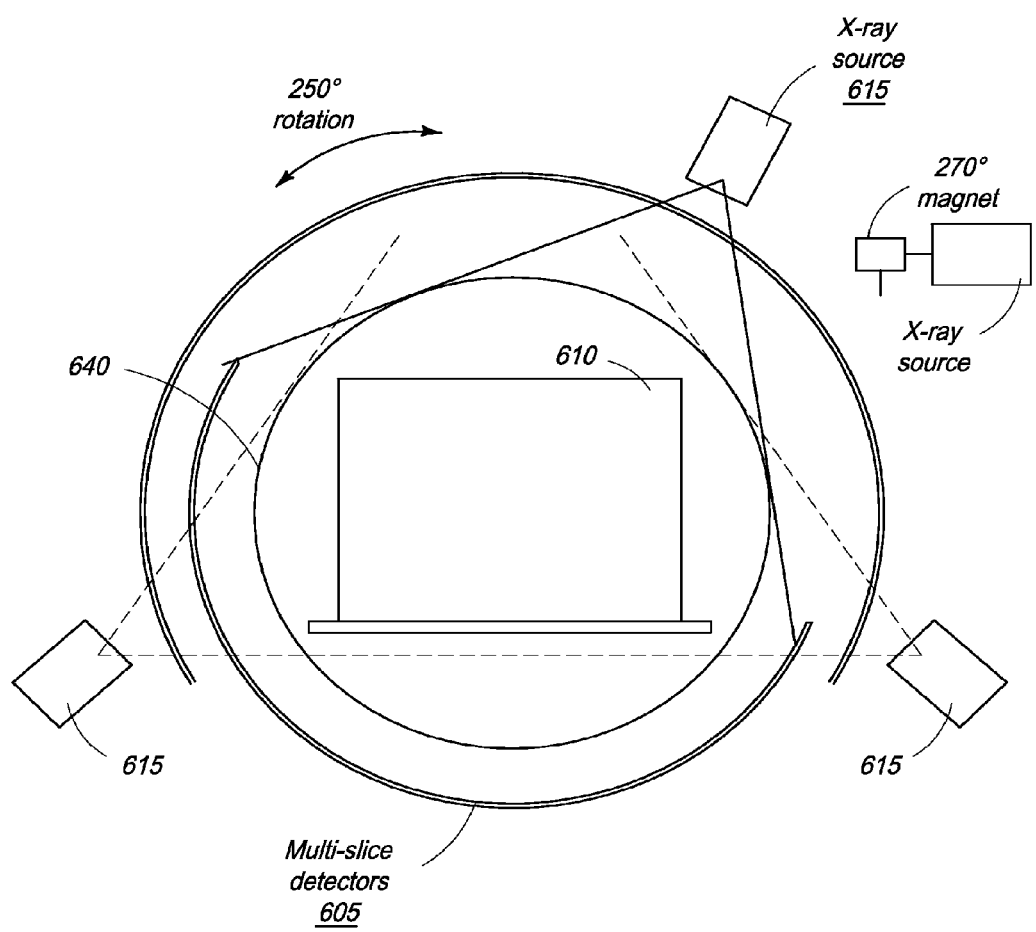
FIG. 6 illustrates a first embodiment of the CT system of the present invention.
Figure 7:
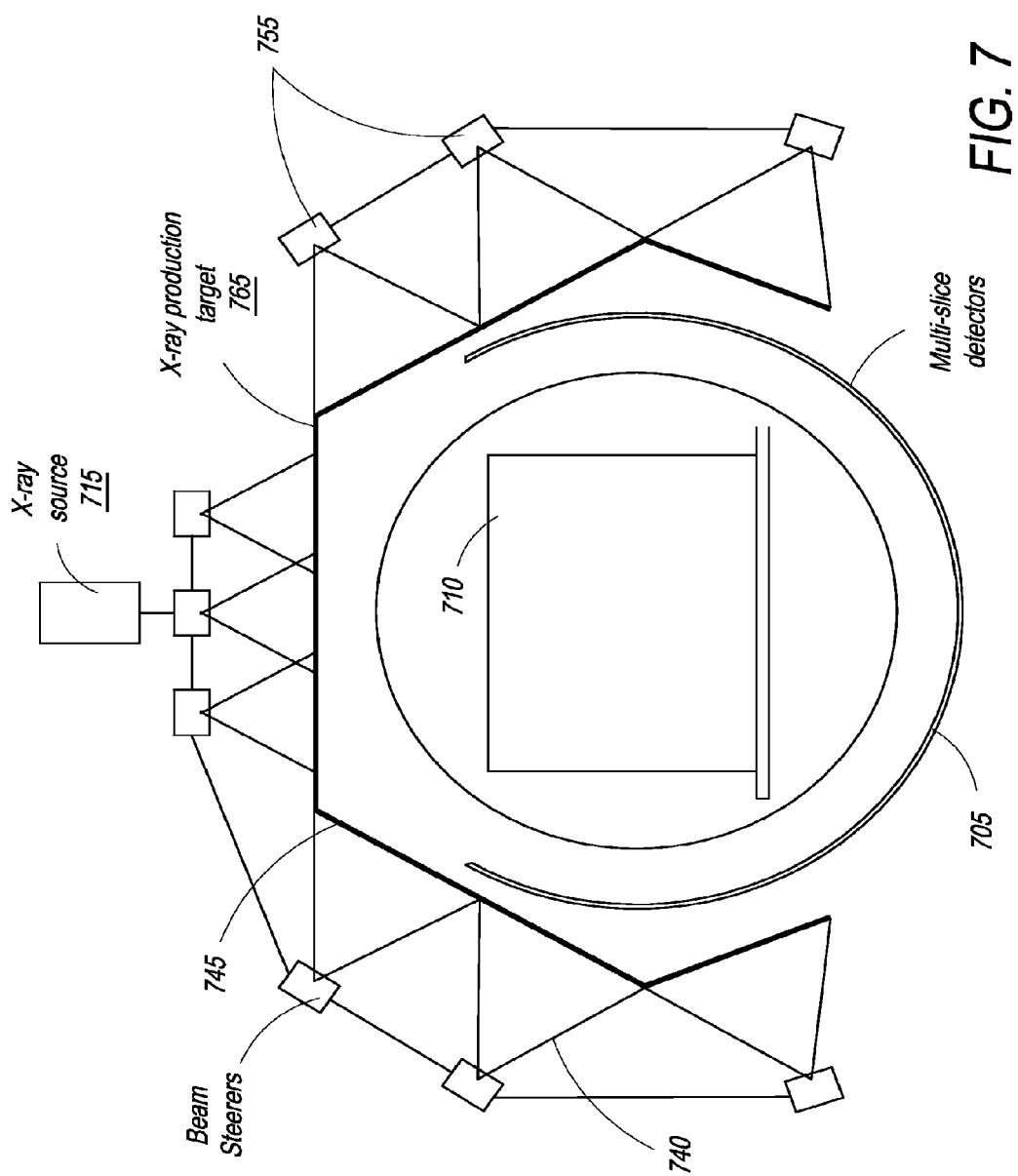
FIG. 7 illustrates a second embodiment of the CT system of the present invention.

Preferred implementations of the present invention in a CT environment are shown in FIGS. 6 and 7. Referring to FIG. 6, a high-energy X-ray source 615 and multi-slice x-ray detectors 605 are arranged opposite to each other and move around the object 610 in a circular trajectory. In this embodiment, sources 615 and detectors 605 cover an angle with scanning radiation 640 that is sufficient for reconstructing a CT image with sufficient image quality. In one embodiment, the angle covered is 180 degrees plus the fan angle, which is approximately 60 degrees, for a total scan angle that is approximately in 240 degrees. Prior to completing a full revolution, however, the source stops, reverses, and then rotates in the opposite direction. In one embodiment, the source and detector arrays rotate 250 degrees prior to reversal. This "oscillating" scanning approach allows for the generation of a complete CT image without the use of a slipring for power and data transfer, which is required when the X-ray source conducts a complete and continuous rotation, as described with reference to FIG. 5. Further, the approach of FIG. 6 reduces the required space under the object. In this embodiment, the step-wise scanning process is repeated until the complete object or the desired section of the object is inspected. In one embodiment, the object is scanned while stationary and moved in increments at the end of each rotation. In another approach, the object moves at a continuous speed which is modulated by the rotation speed of the source and detectors.

In one embodiment, the present invention has a conveyor speed of about 2.67 cm/sec, rotation frequency of around 20 rpm, container length of about 120 cm, throughput of about 80 containers/hour, number of views of in the range of 2000, time per view of about 1.5 ms, pulse per second of about 667 pps, helical pitch of about 1.33, detector width of around 6 cm, magnification of around 1.5, detector pitch of around 5.6 mm, and the number of slices in the range of 16.

The X-ray sources may optionally be coupled with a 270° magnet for compactness.

In another embodiment, the source and detector rotate a smaller angle to cover a scan angle smaller than what is required to produce a CT image and a subsequently a limited angle-CT or laminographic image is reconstructed. This approach is preferred when there are additional space limitations or other constraints and/or when a higher throughput is required. It should be noted that the depth information incrementally improves as the angular range increases. For example, scanning at an angular range of +10 degrees to −10 degrees will yield very little depth information.

Referring to FIG. 7, in yet another embodiment, an electron beam 740, generated from an X-ray source 715, is rastered along an approximated arc by a combination of magnets and quadrupoles 755. The electron beam is directed toward at least one X-ray production target 765 to produce a "rotating" X-ray beam (stationary gantry) 745, while the object 710 is translated at a constant speed. The X-ray production targets are arranged about the scanning volume such that an electronic rotation of the X-ray beam can be achieved. Radiation is detected by multi-slice detectors 705. In contrast with low-energy (140 kV) electron beam Computed Tomography systems employed in medical applications where a reflection geometry is used, the electron and the X-ray observation angle has to be substantially along the same direction of the electron beam because the angular distribution of the bremmstrahlung radiation is forward peaked at megavoltage energies and nearly isotropic at lower energies.

In alternative embodiments, the scanners described above employ dual-energy interlaced X-ray sources to obtain effective atomic images of the cargo.

With a large number of views, CT embodiments of the present invention produce high-resolution 3D "density" and effective Z images with no object superposition. Density and Z are then used to determine composition of cargo and enable clean material discrimination. The CT embodiments can further determine density and Z variations in depth and are ideal for detecting hidden contraband. The embodiments of the present invention also efficiently detect high-density materials, which may indicate possible shielding of radioactive materials.

The various embodiments of the inspection system described above can be implemented in mobile and transportable configurations such that they can be deployed quickly with relatively low footprint requirements. In addition, the use of a single source to achieve images with depth information further allows for mobility of the system, due to lower space and weight requirements.

Figure 8:
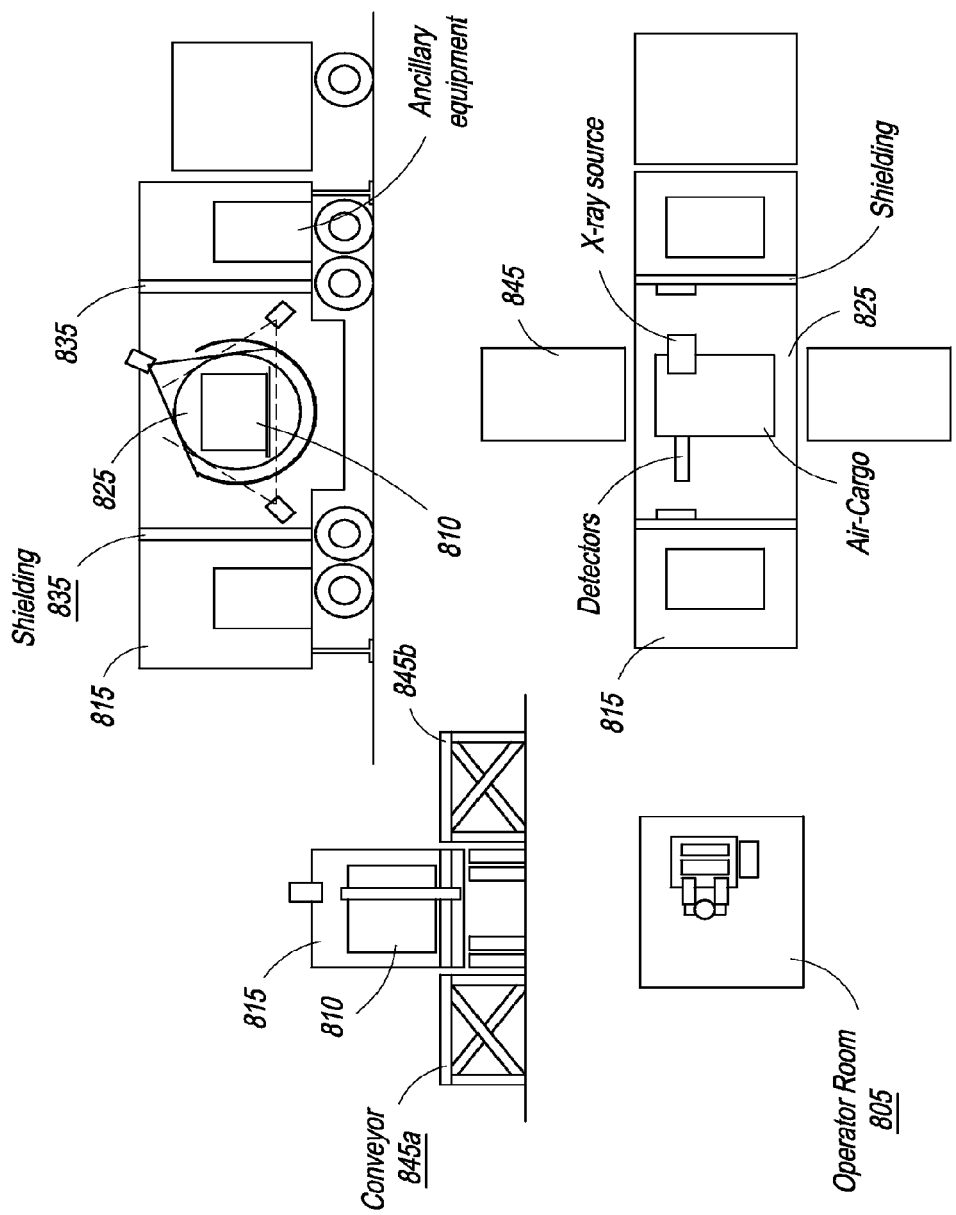
FIG. 8 illustrates an exemplary mobile deployment of the CT system of the present invention.

As shown in FIG. 8, the various embodiments of the present invention described above can be implemented in a mobile configuration to allow for fast deployment. The novel X-ray system 825, as described above, is positioned within a mobile trailer, vehicle, truck, container, or other carrier 815. Shielding within the carrier 835 constrains radiation leakage external to the scanning area. An operator room 805 is positioned separate and apart from the mobile carrier 815 and contains all of the controls required to start, stop, or otherwise control the operation of the X-ray system 825 and conveyor system 845.

The carrier 815 has openings on the sides through which an object 810 can be conveyed using the conveyor system 845, which comprises two external conveyors and an internal conveyor. An entrance 845a and an exit 845b, along with the conveyors translate the object 810 through the X-ray system 825. In one embodiment, the operator room and the external conveyors are located in the trailer 815 for easy redeployment. In another configuration, the container ceiling may have openings to allow for source positioning or motion. During driving, the source is maintained inside the truck.

Figure 9:
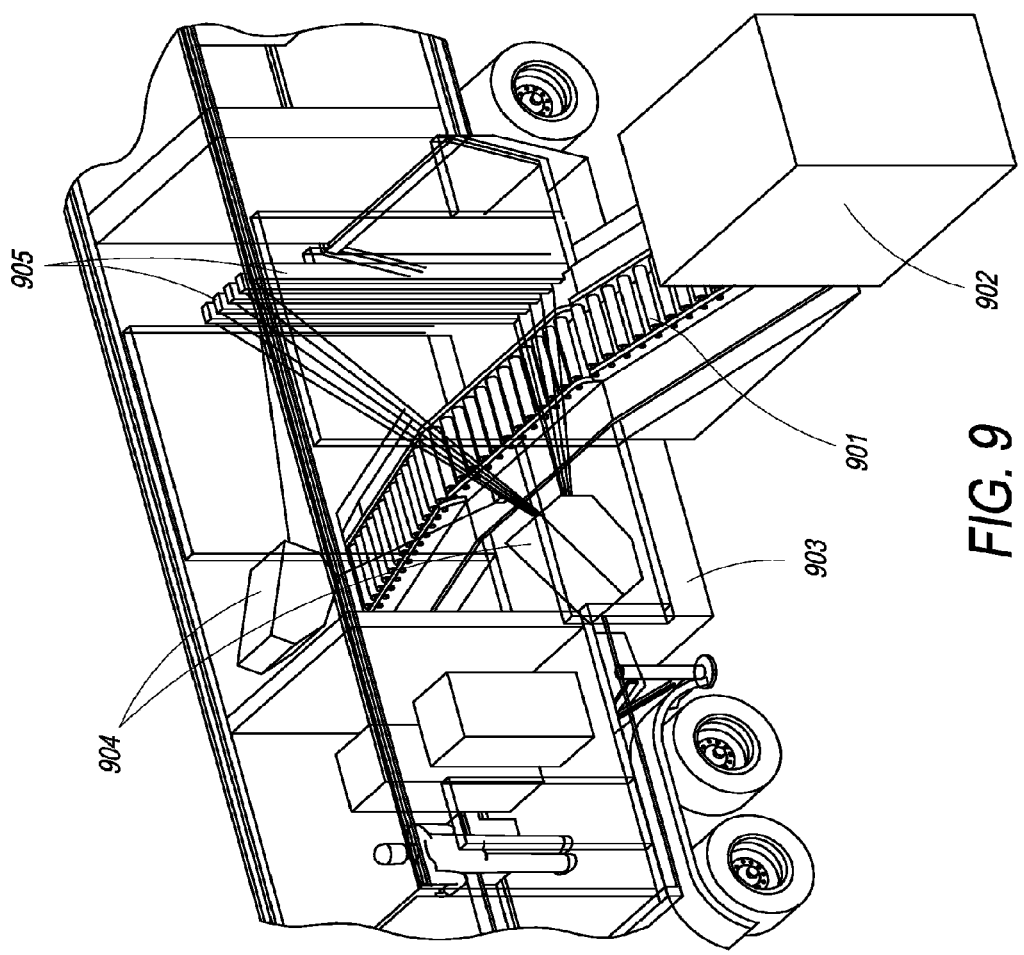
FIG. 9 illustrates one embodiment of the mobile inspection system that uses a conveyer.

FIG. 9 illustrates the mobile inspection system as described above, showing a conveyer system 901 which allows a cargo container 902 to move from one side of the mobile trailer 903 to another. Cargo containers are scanned inside the trailer using the X-ray system, which further comprises X-ray sources 904 and detector arrays 905.

FIG. 10 illustrates another embodiment of the mobile inspection system, wherein the conveyer is replaced by a ramp 1001, which allows cargo 1002 to be driven through the mobile trailer 1003 for scanning.

The above examples are merely illustrative of the many applications of the system of present invention. In other embodiments, the electron linac may be replaced, with a particle accelerator (e.g. deuterons) and the x-ray production targets with neutron production targets (e.g. deuterium gas) to produce neutrons. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:
1. An inspection system for generating an increased number of scanning views of an object under inspection, comprising:
   an X-ray source for generating a high-energy electron beam;
   an electron beam steering system comprising a plurality of steering devices, for directing said electron beam to a corresponding plurality of production targets to generate X-ray beams each having an observation angle, wherein a first of the plurality of steering devices directs a first portion of said electron beam to a first of said plurality of production targets and directs a second portion of said electron beam to a second of the plurality of steering devices, wherein said second of the plurality of steering devices directs a third portion of said electron beam to a second of said plurality of production targets, wherein each of said first and second production targets is different from each other and wherein said plurality of steering devices cause the electron beam to be rastered along an arc around a scanning volume such that the observation angles of the X-ray beams are substantially along a same direction as a direction of the electron beam and an angular distribution of bremmstrahlung radiation is forward peaked at megavoltage energies;
   a plurality of detector arrays that detect said radiation to produce a corresponding plurality of scanning views; and
   a transport mechanism to move the object through the system.

2. The system of claim 1, wherein each of said steering devices is coupled to a production target.

3. The system of claim 1, wherein the number of steering devices, production targets and detector arrays is the same.

4. The system of claim 1, wherein the number of steering devices and production targets is different from the number of detector arrays.

5. The system of claim 1, wherein said steering device is a magnet.

6. The system of claim 1, wherein the X-ray source is a dual-energy X-ray source.

7. The system of claim 1, wherein the X-ray source is a linac.

8. The system of claim 1, wherein said plurality of scanning views are reconstructed to produce a laminographic image of said object.

9. The system of claim 1, wherein said scanning system is contained within a vehicle and further comprises a transport mechanism for translating the object to be inspected from outside the vehicle through the scanning system and wherein said transport mechanism is at least one of a conveyor or ramp.

10. A computed tomography (CT) system for scanning an object, comprising:
   a high-energy X-ray source;
   an electron beam steering system comprising a plurality of steering devices, for directing said electron beam to a corresponding plurality of production targets to generate X-ray beams each having an observation angle, wherein a first of the plurality of steering devices directs a first portion of said electron beam to a first of said plurality of production targets and directs a second portion of said electron beam to a second of the plurality of steering devices, wherein said second of the plurality of steering devices directs a third portion of said electron beam to a second of said plurality of production targets, wherein each of said first and second production targets is different from each other and wherein said plurality of steering devices cause the electron beam to be rastered along an arc around a scanning volume such that the observation angles of the X-ray beams are substantially along a same direction as a direction of the electron beam and an angular distribution of bremmstrahlung radiation is forward peaked at megavoltage energies;

at least one detector subsystem placed opposite to said high energy X-ray source and configured to move along with said high energy X-ray source around the object in an arcuate trajectory; and a transport mechanism to move the object through the system, wherein said source and said at least one detector subsystem in each scanning step rotate an angle around the object and then reverse to rotate around the object in the opposite direction in a subsequent scanning step.

11. The system of claim 10, wherein the arcuate trajectory ranges from 20 to 270 degrees.

12. The system of claim 10, wherein the angle is sufficient for reconstructing a CT image.

13. The system of claim 10, wherein the angle is less than 180 degrees plus the fan beam angle and a laminographic image is reconstructed.

14. The system of claim 10, wherein the at least one detector subsystem comprises at least one of a plurality of detector arrays or a multi-slice detector.

15. The system of claim 10, wherein the object is kept stationary during the system rotation and it is moved incrementally in-between system rotations.

16. The system of claim 10, wherein the object moves along a conveyor at a speed modulated by the rotational speed of the source and detector subsystems, and wherein the conveyor speed varies linearly with the rotational speed of the rotating gantry.

17. The system of claim 10, wherein the X-ray source is a dual-energy source.

18. The system of claim 10, wherein said scanning system is contained within a vehicle and further comprises a transport mechanism for translating the object to be inspected from outside the vehicle through the scanning system and wherein said transport mechanism is at least one of a conveyor or ramp.

19. A computed tomography (CT) system for scanning an object, comprising:

a high-energy source for generating an electron beam;

an electron beam steering system comprising a plurality of steering devices, for directing said electron beam to a corresponding plurality of production targets to generate X-ray beams each having an observation angle, wherein a first of the plurality of steering devices directs a first portion of said electron beam to a first of said plurality of production targets and directs a second portion of said electron beam to a second of the plurality of steering devices, wherein said second of the plurality of steering devices directs a third portion of said electron beam to a second of said plurality of production targets, wherein each of said first and second production targets is different from each other and generates X-ray radiation that scans the object, and wherein said steering devices and production targets are arranged about the scanning volume such that the X-ray radiation produced by the production targets is electronically rotated around the object being scanned such that the observation angles of the X-ray beams are substantially along a same direction as a direction of the electron beam and an angular distribution of bremmstrahlung radiation is forward peaked at megavoltage energies;

a transport mechanism to move the object through the system; and a detector subsystem for detecting the scanning radiation, wherein the detector subsystem is one of at least one detector array or a multi-slice detector.

20. The system of claim 19, wherein the object is translated at a constant speed.

21. The system of claim 19, wherein the source is a dual-energy source.

22. The system of claim 19, wherein said scanning system is contained within a vehicle and further comprises a transport mechanism for translating the object to be inspected from outside the vehicle through the scanning system and wherein said transport mechanism is at least one of a conveyor or ramp.

* * * * *